(12) United States Patent
Mahatwo et al.

(10) Patent No.: US 11,615,195 B2
(45) Date of Patent: *Mar. 28, 2023

(54) SYSTEMS AND METHODS FOR PROVIDING MULTI-NODE RESILIENCY FOR BLOCKCHAIN PEERS

(71) Applicant: Verizon Patent and Licensing Inc., Basking Ridge, NJ (US)

(72) Inventors: Sarang Mahatwo, Piscataway, NJ (US); Ricky Kwan, Florham Park, NJ (US); Jeetendra Pradhan, Budd Lake, NJ (US); Bryan M. Zima, Morristown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 118 days.

This patent is subject to a terminal disclaimer.

(21) Appl. No.: 17/170,338

(22) Filed: Feb. 8, 2021

(65) Prior Publication Data
US 2021/0165891 A1 Jun. 3, 2021

Related U.S. Application Data

(63) Continuation of application No. 16/164,513, filed on Oct. 18, 2018, now Pat. No. 10,949,548.

(51) Int. Cl.
*H04L 9/40* (2022.01)
*G06F 21/60* (2013.01)
(Continued)

(52) U.S. Cl.
CPC .......... *G06F 21/602* (2013.01); *G06F 11/006* (2013.01); *G06F 16/2379* (2019.01);
(Continued)

(58) Field of Classification Search
CPC .. G06F 21/602; G06F 11/006; G06F 16/2379; G06F 16/27; G06F 8/61;
(Continued)

(56) References Cited

U.S. PATENT DOCUMENTS 6,189,111 B1 * 2/2001 Alexander .......... G06F 11/1482
714/13
7,689,862 B1 * 3/2010 Bharthulwar ....... G06F 11/2025
714/13

(Continued)

*Primary Examiner* — David Garcia Cervetti

(57) ABSTRACT

Multi-node resiliency may provide two or more points in a blockchain architecture from which a restarted peer can synchronize its local ledger with local ledgers of other peers that collectively form a distributed ledger. Storage-based resiliency may include providing storage that is separate from the nodes on which peers execute, and configuring a peer to store a copy of a synchronized local ledger to storage prior to restart, and synchronizing a new instance of a local ledger with the synchronized copy from storage upon restarting the peer. Peer-based resiliency may include obtaining a synchronized local ledger or genesis block from a first peer after restarting a second peer. Another point of resiliency may be provided by an orderer cluster that distributes blocks to the peers for committing to their local ledger. A peer may access obtain a synchronized ledger or genesis block from the orderer cluster upon restart.

20 Claims, 8 Drawing Sheets

(51) Int. Cl.
*G06F 11/00* (2006.01)
*G06F 16/27* (2019.01)
*G06F 16/23* (2019.01)
G06F 8/61 (2018.01)
G06F 8/65 (2018.01)
H04L 9/06 (2006.01)

(52) U.S. Cl.
CPC .............. *G06F 16/27* (2019.01); *H04L 63/20* (2013.01); *G06F 8/61* (2013.01); *G06F 8/65* (2013.01); *G06F 2201/805* (2013.01); *H04L 9/0637* (2013.01)

(58) Field of Classification Search
CPC ........ G06F 8/65; G06F 2201/805; G06F 9/54; G06F 21/64; H04L 63/20; H04L 9/0637; H04L 9/3239; H04L 9/50; H04L 63/123
See application file for complete search history.

(56) References Cited

U.S. PATENT DOCUMENTS

| | | | |
|---|---|---|---|
| 9,350,681 B1* | 5/2016 | Kitagawa | H04L 41/12 |
| 9,594,653 B1* | 3/2017 | Misra | G06F 16/2365 |
| 9,799,017 B1* | 10/2017 | Vermeulen | G06Q 20/145 |
| 10,331,695 B1* | 6/2019 | Stickle | G06F 16/27 |
| 10,382,388 B2 | 8/2019 | Li et al. | |
| 10,673,617 B1* | 6/2020 | Antoniou | G06F 13/4282 |
| 10,803,540 B2 | 10/2020 | Schuler et al. | |
| 11,328,278 B2* | 5/2022 | Siefken | G06Q 20/202 |
| 2002/0049845 A1* | 4/2002 | Sreenivasan | H04L 69/40 709/226 |
| 2008/0040628 A1* | 2/2008 | Mandal | G06F 11/1425 714/4.1 |
| 2008/0222159 A1* | 9/2008 | Aranha | G06F 16/21 |
| 2009/0077036 A1* | 3/2009 | Bent | G06F 16/2471 |
| 2009/0077075 A1* | 3/2009 | Bent | G06F 16/256 |
| 2009/0150718 A1* | 6/2009 | Park | H04L 41/0677 714/39 |
| 2009/0157802 A1* | 6/2009 | Kang | H04L 67/1095 707/999.201 |
| 2011/0022882 A1* | 1/2011 | Jaehde | G06F 11/2035 714/E11.073 |
| 2012/0101987 A1* | 4/2012 | Bottorff | G06F 16/27 707/610 |
| 2012/0166390 A1* | 6/2012 | Merriman | G06F 16/2365 707/613 |
| 2012/0171961 A1* | 7/2012 | Qi | H04L 63/0869 455/41.2 |
| 2012/0195189 A1* | 8/2012 | Wang | H04W 40/28 370/225 |
| 2013/0036322 A1* | 2/2013 | Bauer | H04L 67/56 714/E11.023 |
| 2013/0290249 A1* | 10/2013 | Merriman | G06F 16/278 707/610 |
| 2014/0013153 A1* | 1/2014 | Chittigala | H04L 67/10 714/4.11 |
| 2014/0279930 A1* | 9/2014 | Gupta | G06F 11/1471 707/683 |
| 2014/0279931 A1* | 9/2014 | Gupta | G06F 16/27 707/683 |
| 2014/0281675 A1* | 9/2014 | Sreenivasan | G06F 11/2023 714/4.11 |
| 2014/0376362 A1* | 12/2014 | Selvaraj | H04L 41/082 370/221 |
| 2015/0154079 A1* | 6/2015 | Lightner | G06F 11/2041 714/4.11 |
| 2015/0186480 A1* | 7/2015 | Konersmann | G06F 9/5083 707/802 |
| 2015/0254289 A1* | 9/2015 | Junkergard | G06F 16/283 707/738 |
| 2015/0278039 A1* | 10/2015 | Bogdanov | G06F 11/1451 714/4.11 |
| 2015/0378774 A1* | 12/2015 | Vermeulen | G06F 9/466 707/613 |
| 2015/0378775 A1* | 12/2015 | Vermeulen | G06F 16/28 707/703 |
| 2015/0379062 A1* | 12/2015 | Vermeulen | G06F 16/2365 707/691 |
| 2015/0379099 A1* | 12/2015 | Vermeulen | G06F 16/27 707/634 |
| 2015/0379100 A1* | 12/2015 | Vermeulen | G06F 16/27 707/620 |
| 2016/0070589 A1* | 3/2016 | Vermeulen | G06F 9/466 711/153 |
| 2016/0070740 A1* | 3/2016 | Vermeulen | G06F 16/2322 707/703 |
| 2016/0070771 A1* | 3/2016 | Vermeulen | G06F 11/202 707/687 |
| 2016/0085648 A1* | 3/2016 | Joshi | G06F 11/2041 714/4.11 |
| 2016/0085772 A1* | 3/2016 | Vermeulen | G06F 16/21 707/615 |
| 2016/0086260 A1* | 3/2016 | Vermeulen | G06Q 40/00 705/35 |
| 2016/0162547 A1* | 6/2016 | Morris | G06F 16/24542 707/718 |
| 2016/0320759 A1* | 11/2016 | Macha | G06F 11/16 |
| 2017/0031765 A1* | 2/2017 | Yang | G06F 11/1451 |
| 2017/0032014 A1* | 2/2017 | Dickie | G06F 16/278 |
| 2017/0168907 A1* | 6/2017 | Harper | G06F 11/2025 |
| 2017/0272342 A1* | 9/2017 | Zessin | H04W 4/70 |
| 2017/0337534 A1 | 11/2017 | Goeringer et al. | |
| 2018/0101560 A1 | 4/2018 | Christidis et al. | |
| 2018/0152352 A1* | 5/2018 | Kousoulis | G06F 9/45558 |
| 2018/0165166 A1* | 6/2018 | Wang | G06F 11/2033 |
| 2018/0191714 A1* | 7/2018 | Jentzsch | G06F 21/445 |
| 2018/0285217 A1* | 10/2018 | Smith | G06F 21/00 |
| 2018/0343126 A1 | 11/2018 | Fallah et al. | |
| 2018/0374173 A1* | 12/2018 | Chen | G06Q 10/10 |
| 2019/0026146 A1* | 1/2019 | Peffers | G06F 9/5044 |
| 2019/0104102 A1* | 4/2019 | Khan | G06Q 20/382 |
| 2019/0108519 A1* | 4/2019 | Asif | G06Q 20/401 |
| 2019/0109702 A1* | 4/2019 | Maggu | G06Q 20/223 |
| 2019/0123580 A1* | 4/2019 | Bindea | H02J 13/00028 |
| 2019/0190696 A1* | 6/2019 | Singh | G06F 21/64 |
| 2019/0190896 A1* | 6/2019 | Singh | H04L 63/0435 |
| 2019/0199793 A1* | 6/2019 | Sarin | G07F 7/0873 |
| 2019/0207759 A1 | 7/2019 | Chan et al. | |
| 2019/0236559 A1* | 8/2019 | Padmanabhan | G06Q 20/02 |
| 2019/0236598 A1* | 8/2019 | Padmanabhan | G06Q 20/0655 |
| 2019/0236606 A1* | 8/2019 | Padmanabhan | H04L 9/3239 |
| 2019/0238316 A1* | 8/2019 | Padmanabhan | G06N 20/00 |
| 2019/0238525 A1* | 8/2019 | Padmanabhan | H04L 63/101 |
| 2019/0238550 A1* | 8/2019 | Zhang | H04L 63/105 |
| 2019/0251199 A1* | 8/2019 | Klianev | G06F 16/2308 |
| 2019/0295049 A1* | 9/2019 | Karame | G06Q 20/0658 |
| 2019/0303121 A1* | 10/2019 | Padmanabhan | H04L 9/0891 |
| 2019/0305938 A1* | 10/2019 | Sandberg-Maitland | H04L 9/0897 |
| 2019/0305950 A1* | 10/2019 | Treat | H04L 9/3239 |
| 2019/0334954 A1* | 10/2019 | Manamohan | H04L 9/3239 |
| 2019/0342077 A1 | 11/2019 | McMurdie et al. | |
| 2019/0347352 A1* | 11/2019 | Gochkov | H04L 67/1034 |
| 2019/0356469 A1* | 11/2019 | Deshpande | H04L 9/0643 |
| 2019/0356470 A1* | 11/2019 | Deshpande | G06Q 30/0635 |
| 2020/0007313 A1* | 1/2020 | Vouk | H04L 9/3239 |
| 2020/0007317 A1 | 1/2020 | Thompson | |
| 2020/0014745 A1* | 1/2020 | Thurimella | H04L 9/3239 |
| 2020/0034458 A1* | 1/2020 | Mehta | G06F 16/2255 |
| 2020/0036789 A1* | 1/2020 | Mehta | G06F 16/27 |
| 2020/0073758 A1* | 3/2020 | Natarajan | G06F 11/1474 |
| 2020/0073962 A1* | 3/2020 | Natarajan | H04L 9/0643 |
| 2020/0076571 A1* | 3/2020 | Natarajan | G06F 16/2246 |
| 2020/0076827 A1* | 3/2020 | Gluck | H04L 9/3239 |
| 2020/0084194 A1* | 3/2020 | McMurdie | H04L 9/0833 |
| 2020/0089523 A1* | 3/2020 | Cole | H04L 9/3236 |
| 2020/0112432 A1 | 4/2020 | Iwama et al. | |
| 2020/0134616 A1* | 4/2020 | Rafalko | G06Q 10/10 |
| 2020/0162264 A1* | 5/2020 | Zamani | H04L 9/3297 |
| 2020/0213085 A1* | 7/2020 | Fletcher | H04L 9/0637 |

(56) References Cited

U.S. PATENT DOCUMENTS

| | | | | |
|---|---|---|---|---|
| 2020/0259633 A1* | 8/2020 | Gallagher-Lynch | .... | H04L 67/12 |
| 2020/0389291 A1* | 12/2020 | Xiao | ................ | H04L 67/1095 |
| 2021/0165891 A1* | 6/2021 | Mahatwo | ................ | G06F 21/64 |
| 2021/0176058 A1* | 6/2021 | Cheng | ................ | G06Q 20/3825 |

* cited by examiner

SYSTEMS AND METHODS FOR PROVIDING MULTI-NODE RESILIENCY FOR BLOCKCHAIN PEERS

CROSS-REFERENCE TO RELATED APPLICATION

This application is a Continuation of U.S. patent application Ser. No. 16/164,513, filed on Oct. 18, 2018, titled "SYSTEMS AND METHODS FO PROVIDING MULTI-NODE RESILIENCY FOR BLOCKCHAIN PEERS," the contents of which are herein incorporated by reference in their entirety.

BACKGROUND

Blockchain may be an effective technology for securing and verifying data. Blockchain may also be used to create "smart contracts," and/or synchronize and verify activity between different entities.

DETAILED DESCRIPTION OF PREFERRED EMBODIMENTS

The following detailed description refers to the accompanying drawings. The same reference numbers in different drawings may identify the same or similar elements.

Systems and/or methods, as described herein, provide multi-node resiliency for blockchain. The multi-node resiliency may ensure, via incorporation of two or more points of resiliency in a modified blockchain architecture, that a distributed ledger maintained by two or more peers remains synchronized when one or more of the peers are recreated, rebuilt, instantiated, and/or otherwise restarted because of a failure, upgrade, or other reason. In particular, a restarted peer may recover a copy of the ledger that is synchronized with ledgers of other peers from at least one of the different points of resiliency provided as a result of the blockchain architecture modified with the multi-node resiliency.

In some embodiments, the multi-node resiliency may be used to support dynamic scaling of the blockchain network. For instance, peers may initially execute using a first set of resources. As the data and/or transaction volume increases and/or more peers are involved, the peers can be moved to execute using a different second set of resources that is greater than the first set of resources. The multi-node resiliency set forth herein may ensure that the ledgers maintained by the peers remain synchronized even after the peers are moved to different resources, and the peers resume operation from a new set of resources.

In a private and/or permissioned blockchain (e.g., Hyperledger Fabric), the peers may collectively maintain a distributed ledger. The distributed ledger may be the result of each peer maintaining a separate ledger that is synchronized with ledgers maintained by other peers. A synchronized ledger may include the same committed data in the same ordering as other ledgers of the distributed ledger. The data may include recorded changes, transactions, key-value pairs, payments, contractual obligations, activities, and/or any information that is tracked using the distributed ledger. For instance, a first peer may be operated on behalf of a buyer of a product or service, and a second peer may be operated on behalf of a seller of the product or service. The first and second peers may maintain a distributed ledger to track that the two parties are conforming to terms of a contract (e.g., a sale) and/or are satisfying various obligations (e.g., actions, payments, deadlines, etc.) as part of a contract or business relationship.

Peers may include nodes within the blockchain architecture that endorse data, and/or commit the data to a ledger once a consensus is reached by one or more peers that have endorsed the data. Different endorsement policies may change the number of endorsements (e.g., the number of peers) that are needed before a consensus can be reached.

Figure 1:
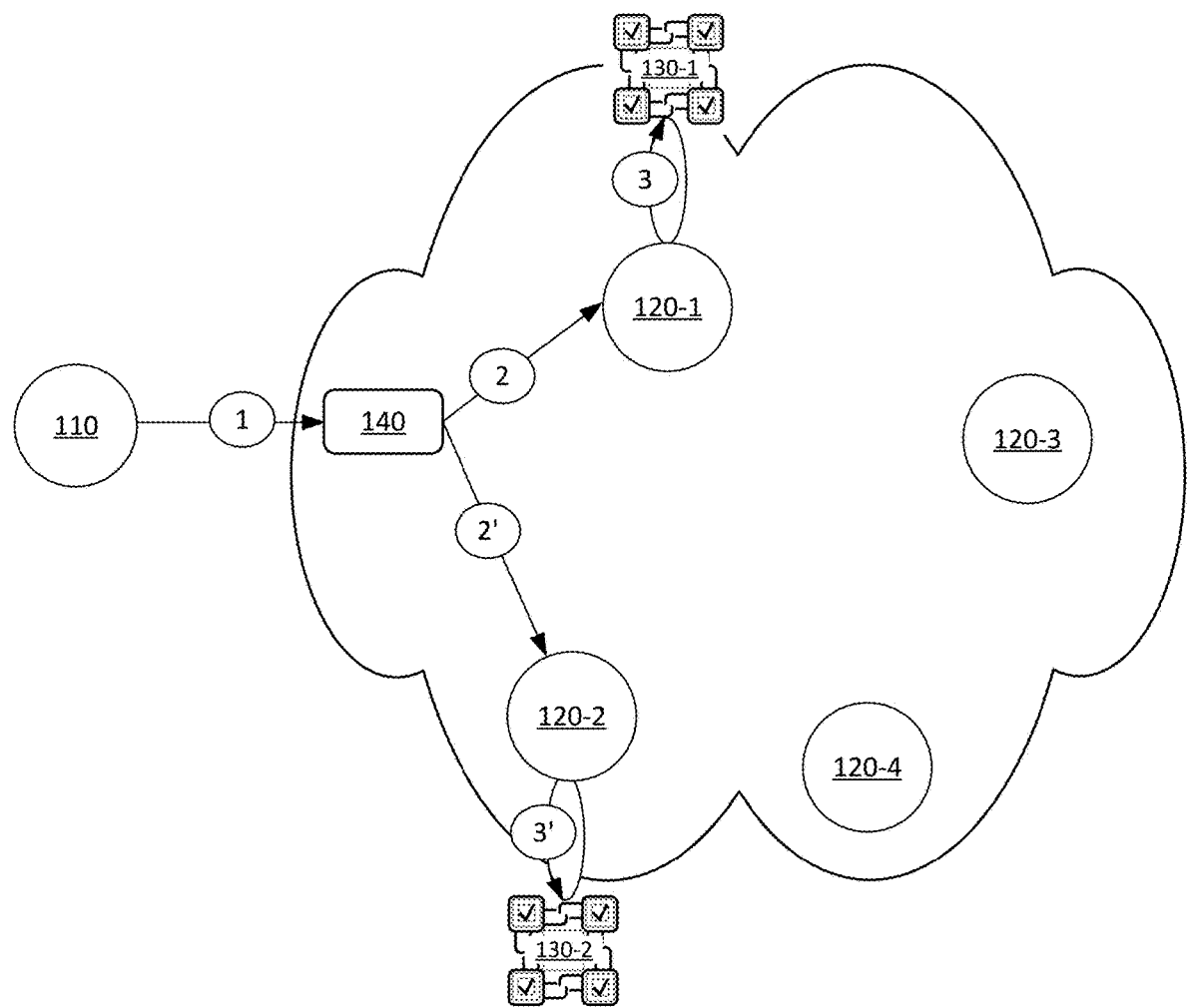
FIG. 1 illustrates an example of a blockchain network with a distributed ledger that is maintained by multiple peers in accordance with some embodiments described herein.

FIG. 1 illustrates an example of a blockchain network with a distributed ledger that is maintained by multiple peers in accordance with some embodiments described herein. As shown in FIG. 1, the blockchain network may include client device 110, nodes 120-1, 120-2, 120-3, and 120-4 (herein sometimes collectively referred to as "nodes 120" or individually as "node 120"), ledgers 130-1 and 130-2 (herein sometimes collectively referred to as "ledgers 130" or individually as "ledger 130"), and orderer cluster 140.

Nodes 120 represent resource sets on which different participating peers may execute. In some embodiments, each node 120 may represent a different device with processing, memory, storage, network, and/or other resources that can be custom configured with a set of software (e.g., Docker containers) to operate as a blockchain peer, storage for a point of resiliency, and/or provide other services related or unrelated to the blockchain network. In some embodiments, each node 120 may provide different partitioned sets of resources for execution of different virtual machines. In some such embodiments, one or more virtual machines can be configured as one or more peers of the blockchain network.

In FIG. 1, node 120-1 may be configured as a first peer, and node 120-2 may be configured as a second peer of the same peer-to-peer blockchain network. Nodes 120-3 and 120-4 may include additional resources that can be used to scale the number of peers for the blockchain network. Nodes 120-3 and 120-4 may also be used for resiliency in the event that the first and/or second peers cannot continue to operate using resources of nodes 120-1 and/or 120-2 because of a failure, security policies, and/or other reasons. The two peers and four nodes 120-1, 120-2, 120-3, and 120-4 are provided to simplify the discussion that follows. In practice, the blockchain network can be expanded to include additional active peers, and more nodes 120 from which the peers can execute. For instance, cloud platforms may provide an essentially unlimited number of nodes 120 that can be configured as peers of a blockchain network. A cloud-based implementation may include running the peers from different sets of resources that are administered by a third-party, and/or from different sets of resources that are on disparate networks.

A distributed ledger may be formed as a result of the first peer maintaining ledger 130-1, the second peer maintaining ledger 130-2, and ledgers 130-1 and 130-2 being synchronized by committing the same data in the same order to each ledger 130-1 and 130-2. Client device 110 may generate the data that the first and second peers commit to their respective ledgers 130-1 and 130-2. In some embodiments, client device 110 may be one or more devices that are operated by participants of the blockchain network, that generate data for endorsement by the first and second peers, and for entry to the distributed ledger. In one example, the blockchain network of FIG. 1 may be used to track transactions and data between a buyer and a seller. The first peer may correspond to (e.g., may be operated by or on the behalf of) the buyer, and the second peer may correspond to (e.g., may be operated by or on the behalf of) the seller, and client device 110 may run an application that generates data for actions, transactions, and/or other exchanges between the buyer and/or seller. When client device 110 generates data for an exchange, the data may be passed to the first and second peers for endorsement to ensure that both participants have verified the accuracy of the data before committing the data to ledgers 130-1 and 130-2.

Orderer cluster 140 may receive (at 1) data from client device 110 after the data is successfully endorsed by one or more of the first and second peers, and/or the first and second peers reach a consensus regarding the endorsement of the data. As noted above, different endorsement policies may change the number of endorsements (e.g., the number of peers) that are needed before a consensus can be reached. A peer may indicate that it has endorsed data generated by client device 110 by signing the data and/or providing a signature that is generated using a unique private key of the peer.

Orderer cluster 140 may distribute (at 2 and 2') endorsed data to the first and second peers for synchronized updating of ledgers 130-1 and 130-2. Since the first and second peers may run on any available node 120, and may run on resources of different nodes 120 at different times, orderer cluster 140 may use Domain Name System (DNS) resolution to identify the first peer operating on node 120-1, the second peer operating on node 120-2, and/or to route the endorsed data to nodes 120-1 and 120-2 corresponding to the first and second peers of the blockchain network. Each node 120 may be accessed via a different Internet Protocol ("IP") address. Each peer of a particular blockchain network may be accessed via the same or different domain name. Accordingly, when a peer is configured to run on a particular node, the peer may register with one or more DNS servers (e.g., authoritative DNS servers for the peer domain) to resolve the domain name that is used to access the peer to the IP address of the particular node. For instance, in FIG. 1, the first peer, upon initialization, may update an "A" record of an authoritative DNS server for the blockchain network (e.g., first and/or second peer domains) to resolve the first peer domain to the IP address of node 120-1. Similarly, the second peer, upon initialization, may update an "A" record of the authoritative DNS server to resolve the second peer domain to the IP address of node 120-2.

The domain names and/or other configuration information for the blockchain network may be retained in the genesis block for the distributed ledger of that blockchain network. The genesis block may be the first block that is committed to the distributed ledger, and may be provided to and/or obtained by each participant of the blockchain network (e.g., orderer cluster 140, the first and second peers, etc.) when commencing operations for the blockchain network. In some embodiments, active peers operating in a private and/or permissioned blockchain network may periodically broadcast or otherwise advertise their addressing to other peers and/or orderer cluster 140 in the same blockchain network, thereby allowing the peers and/or orderer cluster 140 to discover one another upon restart.

The distributed ledger may remain synchronized based on the first peer committing (at 3) the endorsed data to ledger 130-1, and the second peer committing (at 3') the endorsed data to ledger 130-2. In some embodiments, committing (at 3 and 3') the data to ledgers 130-1 and 130-2 may include committing the same block to each ledger 130-1 and 130-2 with each block encompassing different endorsed data generated by client device 110 and/or other client devices participating in the blockchain.

Synchronization with the distributed ledger may be lost if one or more peers are restarted (e.g., recreated, rebuilt, reinstantiated, experience a temporary failure, and/or are otherwise temporarily inactive), and other peers endorse data and reach a consensus that causes the active and/or operational peers to commit the data to their ledgers while the restarted peers are unavailable. When the restarted peers resume operation, their ledgers may not be synchronized with the ledgers of the other peers. As a result, subsequent endorsement and/or committing of data to the distributed ledger may fail.

Synchronization of the distributed ledger can also be lost if one or more peers are restarted, the restarted peers are unavailable for data endorsement, and a consensus to commit the data to the distributed ledger cannot be reached without endorsement from the restarted peers. In this instance, the one or more restarted peers may prevent other peers from updating the distributed ledger, and may cause certain data to be lost and/or not entered to the distributed ledger.

As noted above, some embodiments modify a blockchain architecture to provide different points of resiliency (e.g., multi-node resiliency) that allow a peer to synchronize its ledger with the distributed ledger and/or ledgers of other peers in the event that synchronization is lost. The multi-node resiliency may provide other advantages in addition to synchronizing the ledger of a restarted or inactive peer with the distributed ledger. For instance, the multi-node resiliency may allow the hardware and/or software resources of the peers to be continually updated for security, performance, and/or other reasons without the updated peers disrupting the blockchain. The multi-node resiliency may also allow the blockchain network to scale as needed to support additional peers as the number of participants changes, and/or to increase the resource allocation for individual peers as the data volume changes.

With the multi-node resiliency, a peer running on a first node with a first set of hardware resources can be temporarily brought offline. The peer can be instantiated anew on a second node with a different second set of hardware resources, and the peer can resume operations from the second set of hardware resources with its local ledger remaining synchronized with the distributed ledger.

Figure 2:
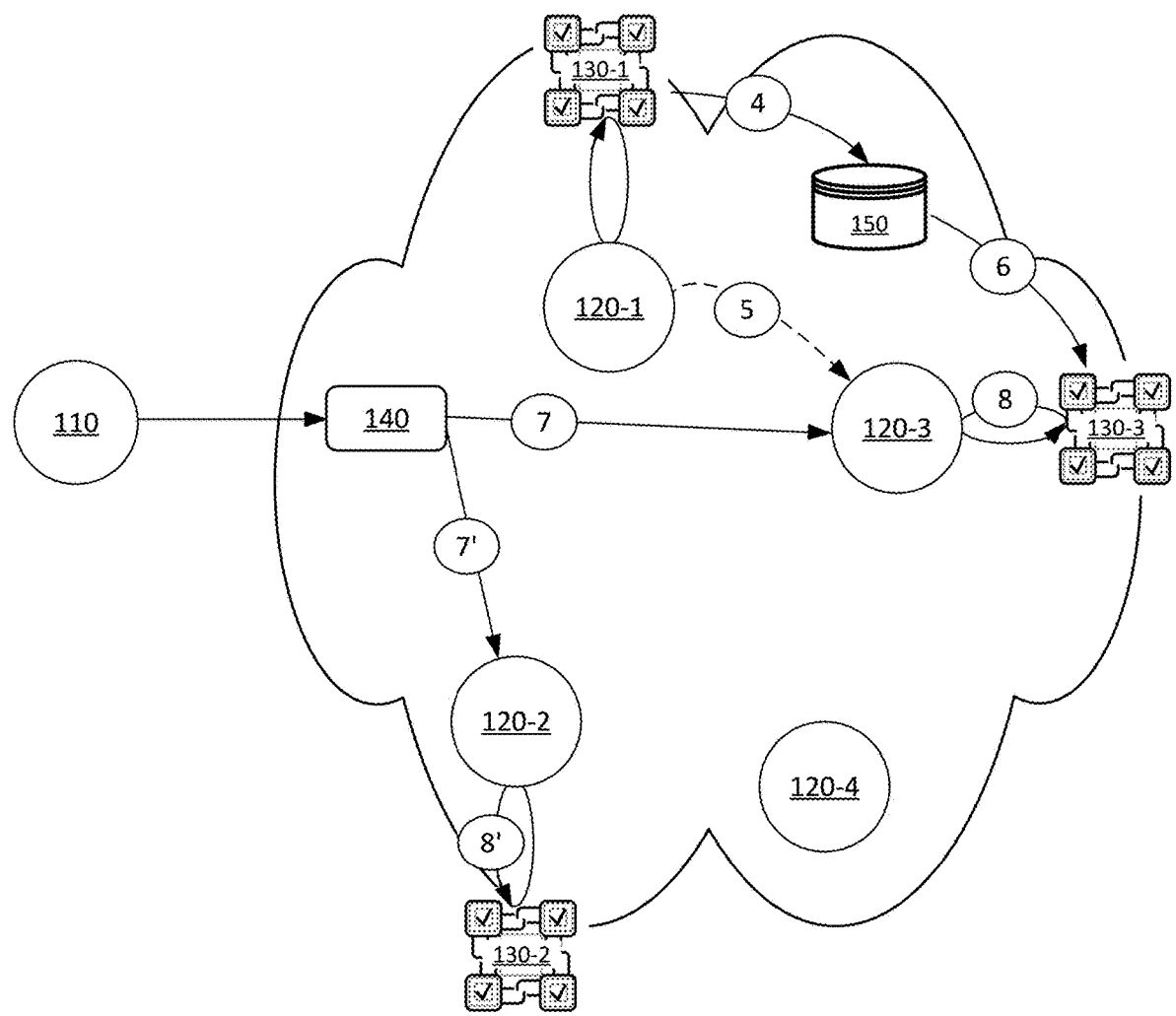
FIG. 2 illustrates an example of synchronizing the distributed ledger using the multi-node resiliency provided for the blockchain architecture in accordance with some embodiments described herein.

FIG. 2 illustrates an example of synchronizing the distributed ledger using the multi-node resiliency provided for the blockchain architecture in accordance with some embodiments described herein. In FIG. 2, storage 150 may be added to the blockchain architecture as a point of resiliency. Storage 150 may be a database, cloud storage, or other storage resource that the first peer may use to store a synchronized copy of ledger 130-1 prior to the first peer restarting, and/or that the second peer may use to store a synchronized copy of ledger 130-2 prior to the second peer restarting. Storage 150 may run using resources of an available node in the same and/or different cloud platform as nodes 120. For instance, storage 150 could be configured to run using resources of node 120-4. Storage 150 may include an intra-region or inter-region point of resiliency. An intra-region point of resiliency may operate in the same geographic region, network, or cloud platform as the peers of the blockchain network, whereas an inter-region point of resiliency may operate from a different geographic region, network, or cloud platform as the peers of the blockchain network.

Ledger 130-1 may be synchronized with ledger 130-2 based on the operations illustrated in FIG. 1 above. The first peer may then, at some point, experience a controlled event that causes the peer to be stopped for some time (e.g., a scheduled shutdown or restart, an effectuated policy that requires a shutdown or restart, etc.). Once the peer is active again (e.g., has been restarted), the peer may, in accordance with some embodiments, use the resources of node 120-3 instead of the previous resources of node 120-1.

Prior to the shutdown, the first peer may periodically, continuously, and/or conditionally, in response to the event, copy (at 4) or otherwise store ledger 130-1 to storage 150. In some embodiments, storage 150 may additionally or alternatively store the genesis block for ledgers 130-1 and 130-2. Storing ledger 130-1 and/or the genesis block on storage 150 may be advantageous in the event that restarting the first peer involves installing (at 5) the software for executing the first peer on node 120-3 and/or wiping node 120-1, including removing software from node 120-1 and/or erasing memory and/or storage of node 120-1. For instance, the first peer may enforce a security policy that requires periodic restarting of the first peer (e.g., every 90 days) with updated software. To minimize downtime, the first peer may continue to run on resources of node 120-1 while available resources of node 120-3 are identified, and software of the first peer is configured on node 120-3. The first peer can then be shut down on node 120-1 and restarted using resources of node 120-3.

When the first peer is restarted using resources of node 120-3, the first peer may commence operation with ledger 130-3 that may not be synchronized with ledger 130-2 of the second peer operating on node 120-2, and/or may be completely devoid of prior data that is tracked to ledger 130-2. The first peer (now implemented by node 120-3) may attempt to synchronize ledger 130-3 via the point of resiliency provided by storage 150. The restarted first peer may identify storage 150 and/or other points of resiliency within the modified blockchain architecture based on a set of configured domain names and/or addressing that identify the one or more points of resiliency.

In some embodiments, synchronizing (at 6) ledger 130-3 may include obtaining a genesis block for the distributed ledger from storage 150. The first peer may then synchronize and/or verify ledger 130-3 with ledger 130-2 and/or the distributed ledger by obtaining the rest of the blocks from elsewhere in the blockchain network. For instance, in accordance with some embodiments, the genesis block may contain configuration information that identifies orderer cluster 140 and/or the second peer (running on resources of node 120-2) from which the first peer may obtain the rest of the blocks. In some embodiments, synchronizing (at 6) ledger 130-3 may include obtaining a copy of ledger 130-1 that is synchronized with ledger 130-2 from storage 150, updating ledger 130-3 using the synchronized copy of ledger 130-1, and/or verifying that the blocks and/or order of blocks in updated ledger 130-3 match the blocks and/or order of blocks in ledger 130-2.

Once ledger 130-3 has been synchronized and/or verified (at 6) with ledger 130-2 of the second peer and/or the distributed ledger, node 120-3 may identify itself within the blockchain network as a restarted instance of the first peer. For instance, the first peer, via node 120-3, may submit an update to an authoritative DNS server for the blockchain network so that one or more domain names for accessing the first peer that were previously resolved to an address of node 120-1 are now resolved to an address of node 120-3. In some embodiments, the first peer may identify and/or access the authoritative DNS server based on configuration information from the genesis block, and/or based on addressing that is configured when restarting the first peer on node 120-3. In some embodiments, a blockchain network administrator may control the restarting of the first peer on node 120-3 and/or the updating of the authoritative DNS server. In some embodiments, the restarted first peer may submit a request to orderer cluster 140 to join or participate in the blockchain network from node 120-3. From the request, orderer cluster 140 may determine that the first peer is no longer operating from node 120-1, and/or is now operating from node 120-3. Accordingly, orderer cluster 140 may update configuration information for the blockchain network to identify operation of the first peer from node 120-3. Additionally, or alternatively, orderer cluster 140 may update the DNS operation on behalf of the restarted first peer.

With synchronized ledgers 130-2 and 130-3 and/or the updated DNS operation, the first and second peers may continue to endorse data on behalf of clients 110, reach a consensus regarding the endorsement of the data, receive endorsed data (at 7 and 7') from orderer cluster 140, and/or enter (at 8 and 8') the endorsed data to their respective local ledger 130 (e.g., ledger 130-2 for the second peer 120-2, and ledger 130-3 for the restarted first peer). For instance, orderer cluster 140 may direct newly received endorsed data from clients 110 to the same one or more domain names that were previously used to access the first peer and the second peer. The DNS servers, as a result of the updates, may identify the correct addressing for accessing the first and second peers regardless of the peers operating on different nodes 120 at different times. For instance, in FIG. 2, the DNS servers may resolve the one or more domain names to the addressing of node 120-3 (executing the restarted first peer) and 120-2 (executing the second peer) so that orderer cluster 140 may distribute (at 7 and 7') the endorsed data to nodes 120-3 and 120-2, and the first and second peers may commit (at 8 and 8') the endorsed data (e.g., blocks containing the endorsed data) to ledgers 130-3 and 130-2.

In some embodiments, different instances of storage 150 may be deployed throughout the blockchain network to provide different points of resiliency. For instance, a first instance of storage 150 may be configured on each node 120-1 and 120-2 and may provide a first point of resiliency with which a restarted node may synchronize a local ledger with the distributed ledger. A second instance of storage 150 may provide a second point of resiliency from one or more nodes that are geographically adjacent to nodes 120-1 and 120-2. For instance, a second instance of storage 150 may execute on a node (e.g., node 120-4) that is in the same geographic region as nodes 120-1 and 120-2 and that is not currently configured as a peer in the same blockchain network as nodes 120-1 and 120-2. A third instance of storage 150 may provide a third point of resiliency from one or more nodes that are in different geographic regions and/or are operated by different cloud platforms than nodes 120-1 and 120-2. Any of the different points of resiliency can be used to synchronize the ledger of a restarted node with the distributed ledger. The different points of resiliency provide failsafes and redundancy in case a restarted node is unable to access one or more instances of storage 150.

Security and/or other policies may cause the first peer and/or the second peer to periodically restart. For instance, a security policy may require the peers to restart every three months when the peers are hosted on a cloud platform (e.g., resources that are not privately managed or that are not managed by the entities generating the data being tracked to the distributed ledger). The security policy may restart the peers in order to update the operational resources (e.g., software and/or hardware) on which the peers execute. For instance, in FIG. 2, the first peer may be running with outdated and/or unpatched software on node 120-1, and may be restarted on node 120-3 after configuring node 120-3 with updated and/or patched software. The peers may be restarted for security, performance, reliability, and/or other reasons.

FIG. 2 illustrates restarting a new instance of the first peer on resources of node 120-3 instead of resources of node 120-1 used for a previous instance of the first peer. In some embodiments, the first peer may be restarted on different hardware resources (e.g., node 120-3 instead of node 120-1) when a policy is enforced to scale and/or improve performance of the first peer, and node 120-3 may provide additional resources and/or faster performing resources than node 120-1. In some such embodiments, the first peer may automatically query the cloud platform to identify node 120-3 as an available node with the necessary resources prior to restarting. In some other embodiments, a blockchain network administrator may query the cloud platform for available resources to scale the first peer operation, and/or may configure the first peer to restart on node 120-3.

In some embodiments, the first peer may be restarted on the same resources of node 120-1 when the restart involves patching and/or updating the software without changing the underlying hardware resources. In some such embodiments, the software can be patched and/or updated while the first peer continues to run on node 120-1, and the first peer may be restarted in order for the patches and/or updates to take effect. The one or more policies effectuated by the first peer may therefore specify whether the peer restarts on the same or different node 120.

The one or more policies causing the restart of the first peer in FIG. 2 may also cause the second peer, operating on node 120-2, to also restart at the same time or at a later time. In some embodiments, each peer of the blockchain network (e.g., the first peer and the second peer) may operate under a different set of policies, and the different set of policies may cause the first peer and the second peer to restart at the same or different times. The different sets of policies may be defined by different entities exchanging the data and/or engaging the transactions that are tracked via the distributed ledger of the blockchain network.

FIG. 2 also illustrates one or more storage-based points of resiliency of the multi-node resiliency that can be used to synchronize the distributed ledger. The multi-node resiliency may also provide other points of resiliency from other nodes (e.g., other than storage 150) of the blockchain architecture. The other points of resiliency may be relied upon to synchronize the distributed ledger when the ledger of a restarted peer is not entered to storage 150 prior to that peer restarting and/or storage 150 does not contain sufficient information with which to synchronize the ledger of the restarted peer. For instance, one or more of the peers may be restarted because of a failure and/or an uncontrolled event. A peer may experience hardware, software, network, and/or other failures that necessitate a restart prior the peer storing a synchronized copy of its ledger to storage 150.

Figure 3:
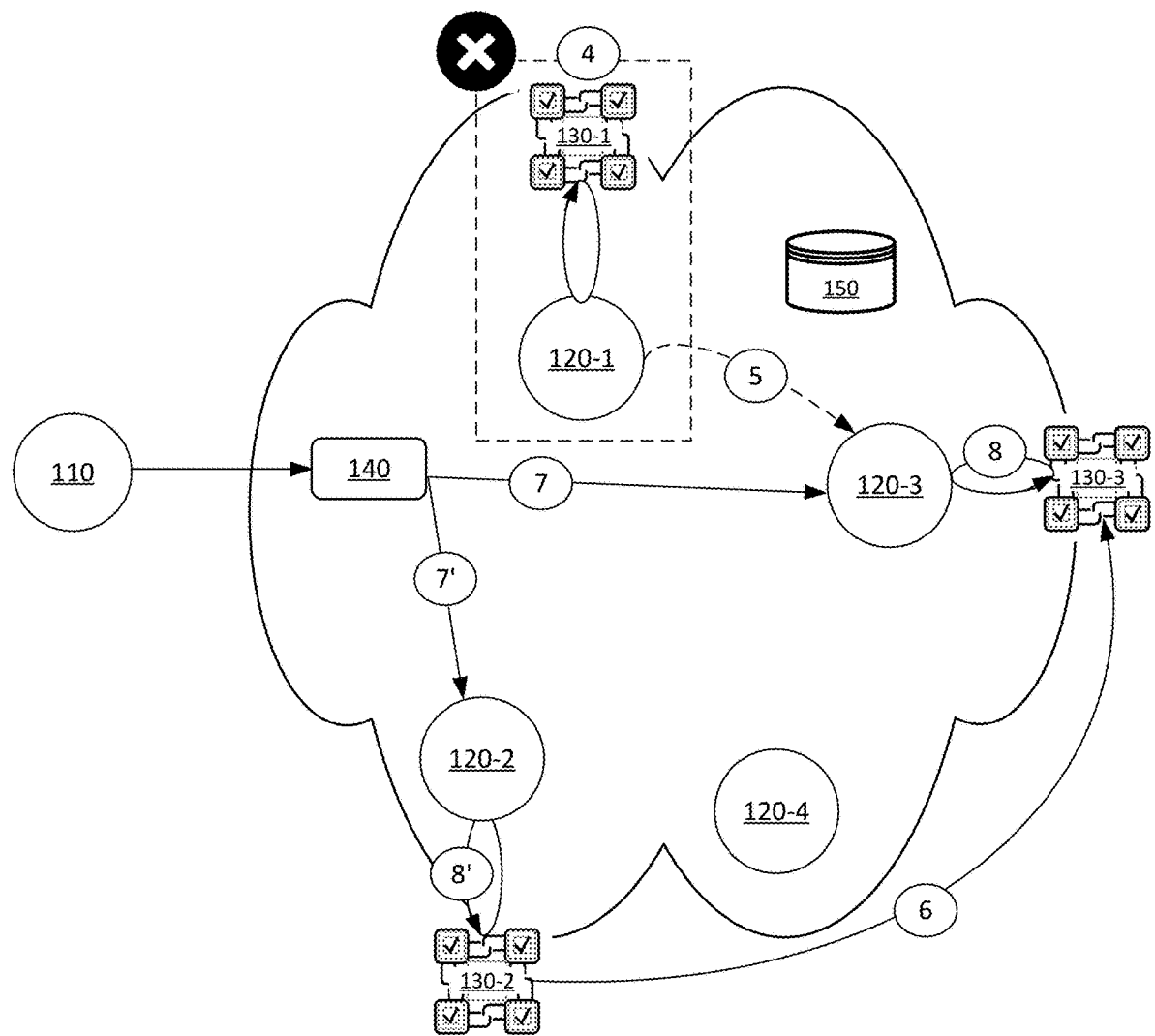
FIG. 3 illustrates an example of synchronizing the distributed ledger in response to recovering from a peer failure using peer-based resiliency of the multi-node resiliency in accordance with some embodiments described herein.

FIG. 3 illustrates an example of synchronizing the distributed ledger in response to recovering from a peer failure using peer-based resiliency of the multi-node resiliency in accordance with some embodiments described herein. As shown in FIG. 3, the first peer may experience (at 4) an uncontrolled and/or unexpected event (e.g., hardware, software, network, and/or other failure) when executing using resources of node 120-1. The uncontrolled event may prevent the first peer from participating in the blockchain network, and may necessitate a restart of the first peer on a different node (e.g., node 120-3). The uncontrolled and/or unexpected event may also prevent the first peer from copying ledger 130-1, that is synchronized with ledger 130-2 and/or the distributed ledger, into storage 150 prior to the event.

FIG. 3 therefore illustrates synchronizing and/or verifying a ledger of the restarted first peer via a different second point of resiliency provided by the modified multi-node resiliency blockchain architecture. In particular, the first peer may restart (at 5) using resources of node 120-3 after the failure is detected by the first peer, the second peer, orderer cluster 140, and/or an administrator of the blockchain network. For instance, orderer cluster 140 may distribute endorsed data to the first peer and the second peer for committing to ledgers 130-1 and 130-2. The second peer may provide orderer cluster 140 with confirmation that the endorsed data has been committed to ledger 130-2. However, orderer cluster 140 may not receive confirmation from the first peer. Orderer cluster 140 may therefore detect the failure of the first peer, and may restart (at 5) the first peer on node 120-3. Similarly, the first peer may detect an error, performance that does not satisfy a performance threshold, and/or other issues that may cause the first peer to restart (at 5) on node 120-3. Restarting the first peer may include installing and/or configuring the software for the first peer on hardware resources provided by node 120-3.

The first peer may restart on node 120-3 with ledger 130-3 that is initially not synchronized with ledger 130-2 of the second peer and/or the distributed ledger. However, the first peer may identify the second peer as another participant in the private and/or permissible blockchain network, and therefore a point of resiliency that can be used to synchronize ledger 130-3. Accordingly, the first peer may synchronize and/or verify (at 6) ledger 130-3 with ledger 130-2 of the second peer in a similar manner as described above with reference to FIG. 2. For instance, the first peer may access ledger 130-2 of node 120-2 in order to verify the blocks and/or order of blocks in ledger 130-3. In some embodiments, the first peer may update missing blocks of ledger 130-3 using blocks from ledger 130-2.

In some embodiments, the first peer may identify the second peer as another participant in the blockchain network based on configuration information from the genesis block of the distributed ledger. Upon restarting (at 5) the first peer on node 120-3, the first peer may be configured to obtain the genesis block of the distributed ledger from storage 150, orderer cluster 140, and/or another point of resiliency in the modified blockchain architecture. For instance, the first peer, operating from node 120-3, may submit a request to orderer cluster 140 to join the blockchain network, and orderer cluster 140 may provide the restarted first peer with the genesis block. The genesis block may provide configuration information that allows the restarted first peer to identify and/or connect to orderer cluster 140, other peers (e.g., the second peer operating from node 120-2), and/or other points of resiliency. Accordingly, any peer of the blockchain network and/or orderer cluster 140 may serve as a point of resiliency with which to synchronize and/or verify the ledger of a node that is restarted. These points of resiliency may be provided in addition to or instead of the points of resiliency provided by one or more instances of storage 150 that may be distributed throughout the blockchain network.

The restarted first peer may update the DNS operation of the blockchain network to identify operation of the first peer from node 120-3 instead of node 120-1. In some embodiments, the restarted first peer may connect to orderer cluster 140 and submit a request to join the blockchain network. Orderer cluster 140 may update the DNS operation on behalf of the first peer and/or update configuration information to identify operation of the first peer from node 120-3. Orderer cluster 140 may then distribute (at 7) endorsed data to the first peer at node 120-3 for entry (at 8) to ledger 130-3, and may distribute (at 7') endorsed data to the second peer at node 120-2 for entry (at 8') to ledger 130-2.

The storage-based resiliency illustrated in FIG. 2 and/or the peer-based resiliency illustrated in FIG. 3 may be used for staggered restarting of two or more peers in the blockchain network. For instance, a configured policy may cause all peers to restart essentially simultaneously. Using the peer-based resiliency, a first peer may be restarted, synchronized, and/or verified using a ledger of a second peer. Once the restarted first peer is synchronized and operational, the second peer may be restarted and synchronized and/or verified using a ledger of the first.

Figure 4:
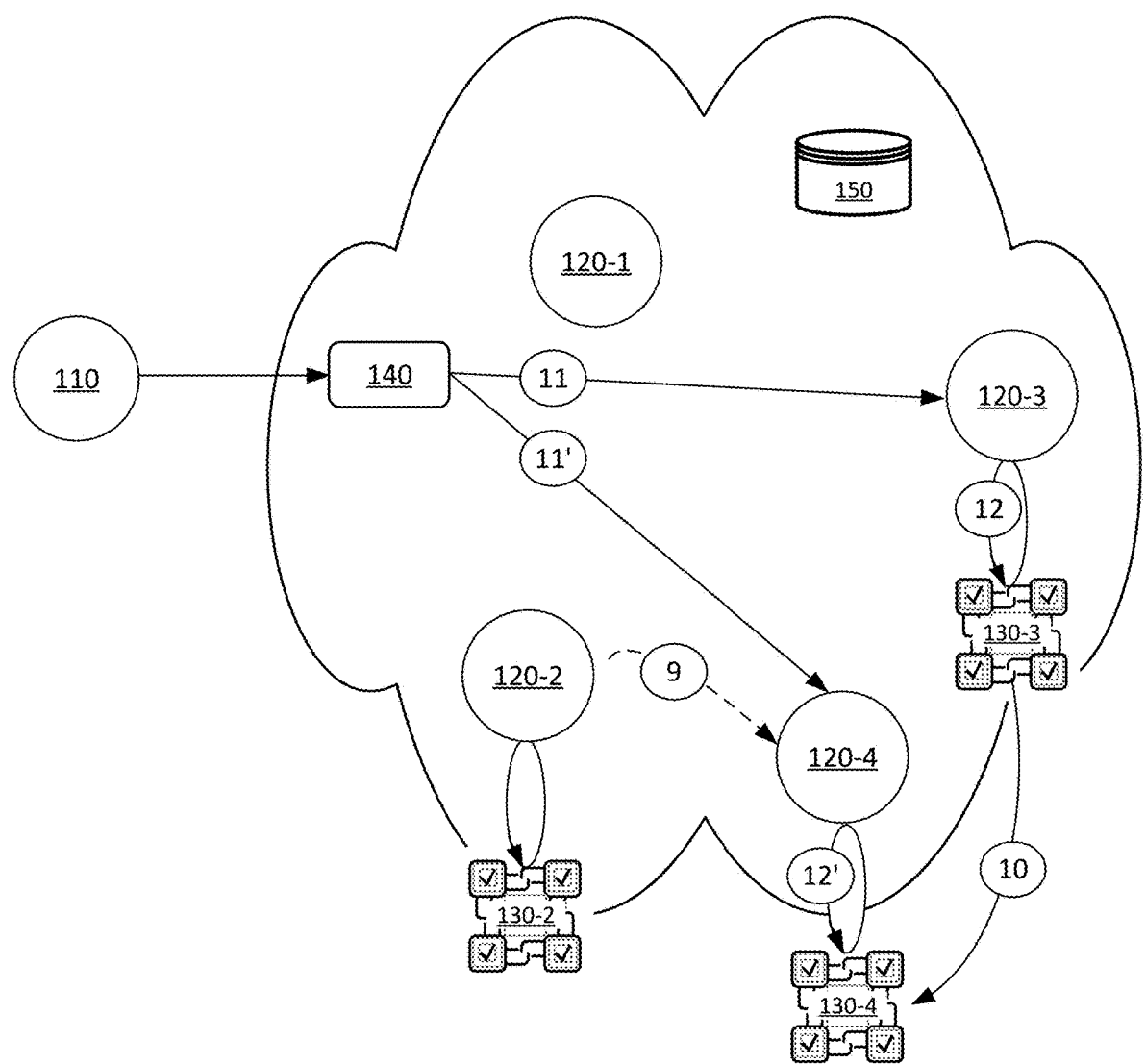
FIG. 4 illustrates an example of staggered synchronization of the peers using the peer-based resiliency in accordance with some embodiments described herein.

FIG. 4 illustrates an example of staggered synchronization of peers using the peer-based resiliency in accordance with some embodiments described herein. FIG. 4 may continue after the first peer is restarted on node 120-3 and ledger 130-3 is synchronized using either the storage-based resiliency illustrated in FIG. 2, or the peer-based resiliency illustrated in FIG. 3. Once ledger 130-3 of the restarted first peer is synchronized, the second peer may be restarted and synchronized.

For instance, the first peer may provide a message to the second peer after the first peer restarts on node 120-3. The message may cause the second peer to restart. In some embodiments, the second peer may restart in response to a controlled event (e.g., a security policy).

Restarting the second peer may involve continuing to run the second peer on node 120-2 while querying the cloud platform to identify node 120-4 as having available resources for the restarted instance of the second peer. Upon identifying node 120-4, the second peer may install (at 9) updated software for running a new instance of the second peer on node 120-4 and/or configuring the software. The second peer may then shut down operations on node 120-2, restart operations on node 120-4, and/or synchronize (at 10) or verify ledger 130-4 of the restarted second peer via ledger 130-3 of the restarted first peer. Upon restarting on resources of node 120-4, the second peer may be configured to access storage 150 and/or another node (e.g., orderer cluster 140) in the blockchain network in order to obtain the genesis block for the distributed ledger. Based on configuration information in the genesis block, the second peer may join and/or connect to the blockchain network, and identify other peers participating in the blockchain network (e.g., the first peer operating using resources of node 120-3). The restarted second peer may then obtain the rest of the blocks by which ledger 130-4 of the restarted second peer can be synchronized with the distributed ledger and/or ledger 130-3 of the restarted first peer.

The second peer may update DNS operation of the blockchain network and/or broadcast or otherwise advertise addressing of node 120-4 to signal to orderer cluster 140 and/or other peers in the same blockchain network that the second peer is operating from node 120-4. In some embodiments, the second peer may connect to orderer cluster 140 and/or request to join the blockchain network. The restarted first and second peers may receive (at 11 and 11') endorsed data from orderer cluster 140, and may commit (at 12 and 12') the endorsed data to synchronized ledgers 130-3 and 130-4.

In some embodiments, the staggered restarting and/or synchronizing of different peers may be conducted using the storage-based resiliency illustrated in FIG. 2. For instance, the first peer may store a synchronized copy of ledger 130-1 to storage 150 before restarting. Upon restarting on node 120-3, the first peer may synchronize and/or verify ledger 130-3 using the copy of ledger 130-1 from storage 150. At the same time as or after restarting the first peer, the second peer may store a synchronized copy of ledger 130-2 to the same or different storage 150. Upon restarting on node 120-4, the second peer may synchronize and/or verify ledger 130-4 using the copy of ledger 130-2 from storage 150.

Figure 5:
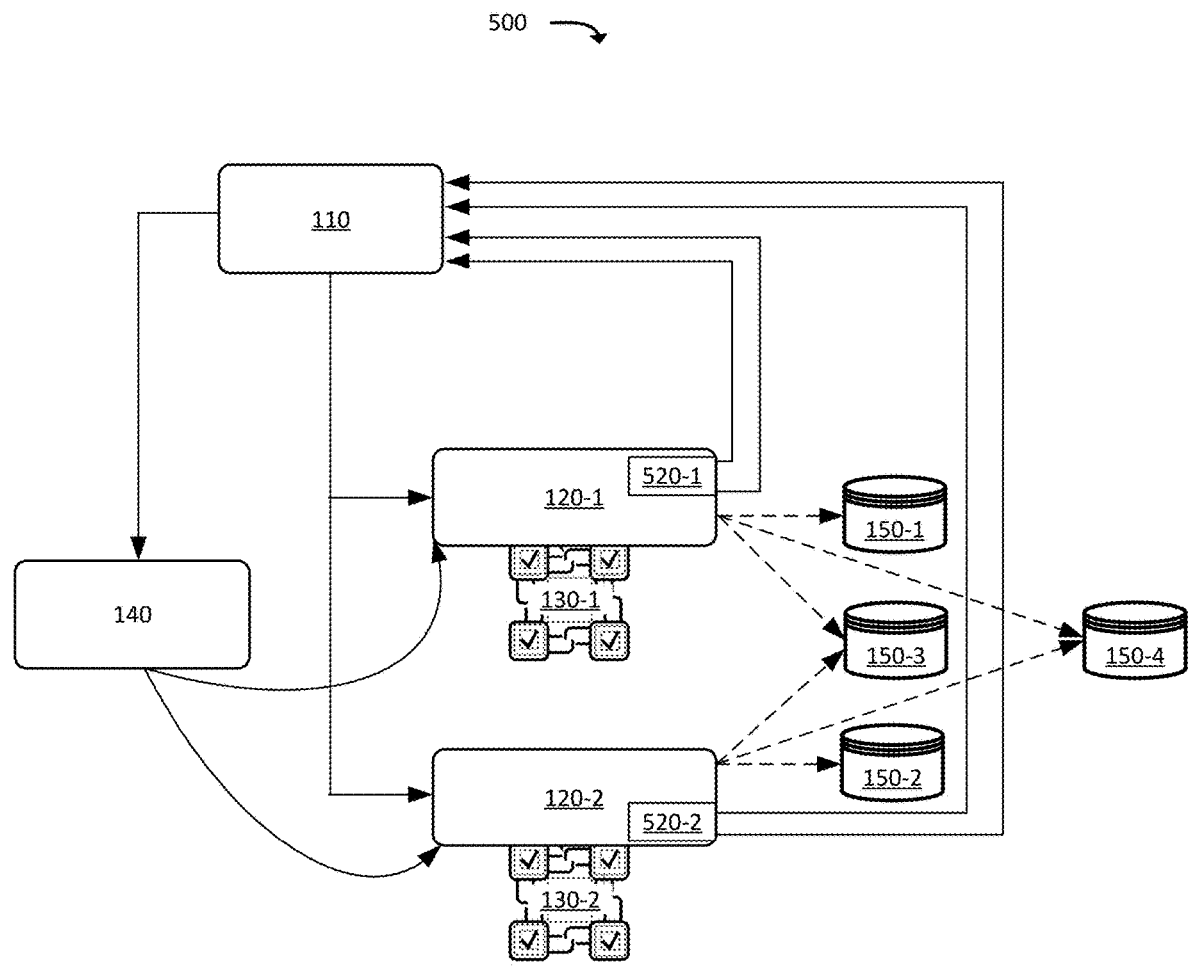
FIG. 5 illustrates an example environment, in which one or more embodiments, described herein, may be implemented.

FIG. 5 illustrates example environment 500, in which one or more embodiments, described herein, may be implemented. Environment 500 may represent a peer-to-peer, private, and/or permissioned blockchain network providing multi-node resiliency. In some embodiments, environment 500 may represent a Hyperledger Fabric that is modified with multi-node resiliency.

Environment 500 may include client device 110, nodes 120-1 and 120-2, ledgers 130-1 and 130-2, orderer cluster 140, and/or storage 150-1, 150-2, 150-3, and 150-4 (herein sometimes collectively referred to as "storage 150" or individually as "storage 150"). The quantity of devices, illustrated in FIG. 5, is provided for explanatory purposes only. In practice, environment 500 may include additional systems, devices, and/or networks; fewer systems, devices, and/or networks; different systems, devices and/or networks; or differently arranged systems, devices, and/or networks than illustrated in FIG. 5. For example, while not shown, environment 500 may be implemented on scalable resources of one or more cloud platforms. Accordingly, in some embodiments, environment 500 may include additional nodes 120 that are either actively configured as blockchain peers or available as resources that can be configured as blockchain peers and/or other resources for the blockchain network including orderer cluster 140, storage 150, and/or devices. Environment 500 may also include more or less storage 150 depending on the desired points of resiliency for the blockchain network.

Environment 500 may also include devices that facilitate or enable communication between various components shown in environment 500, such as routers, network switches, gateways, DNS servers (e.g., authoritative, recursive, and/or other DNS servers), etc. Systems and devices of environment 500 may interconnect with each other and/or other systems or devices via wired connections, wireless connections, or a combination of wired and wireless connections. For instance, when environment 500 is implemented using resources of one or more cloud platforms, the cloud resources on which orderer cluster 140, nodes 120, storage 150, and/or other devices execute may be assigned Internet Protocol (IP) and/or other addressing for accessing the devices regardless of the cloud resources that are configured to run the devices. In some implementations, one or more systems and/or devices of environment 500 may be physically integrated in, and/or may be physically attached to, one or more other devices of environment 500.

Client device 110 may represent one or more entities that act on behalf of end-users of the blockchain. Client device 110 may submit data for endorsement to one or more peers. In particular, client device 110 may generate and send a data and/or transaction proposal that includes an identifier associated with client device 110, an identifier associated with a chaincode and/or distributed ledger to which the data pertains, a payload that contains the data that is subject to endorsement, a timestamp, a signature of client device 110 that is generated using a private key, and/or other fields. The payload may specify the policies and/or conditions of endorsement policies 520 that can be used to endorse the data. Client device 110 may also submit endorsed data to orderer cluster 140 where the endorsed data may be grouped with other endorsed data into blocks that the peers then commit to the distributed ledger. Although client device 110 is illustrated in FIG. 5 as a single device, environment 500 may support several client devices 110 and/or applications running from client device 110 that the data that is tracked via the distributed ledger formed by ledgers 130.

Orderer cluster 140 may group endorsed data from one or more client devices 110 into blocks. Orderer cluster 140 may distribute the blocks to the peers of a particular blockchain network, and the peers may commit the blocks to the distributed ledger for that particular blockchain network.

In some embodiments, orderer cluster 140 may provide one or more shared communication channels. Each communication channel may allow one or more client devices 110 to communicate with a different set of peers associated with a different distributed ledger. In particular, orderer cluster 140 may provide a broadcast, multicast, or other suitable communication service that receives endorsed data from client device 110, and that delivers the endorsed data to the peers maintaining the distributed ledger for the endorsed data.

The communication channels created by orderer cluster 140 may allow the blockchain network to simultaneously support different distributed ledgers while limiting the data and/or distributed ledgers that can be accessed by different client devices 510 and/or peers. For instance, a first client device may connect to a first channel, and may provide first data to orderer cluster 140 via the first channel. Orderer cluster 140 may provide the first data to a first set of peers (e.g., the first and second peers executing using resources of nodes 120-1 and 120-2) that maintain a first distributed ledger. A second client device may connect to a different second channel, and may provide second data to orderer cluster 140 via the second channel. Orderer cluster 140 may provide the second data to a different second set of peers that maintain a different second distributed ledger. The first client and/or the first set of peers cannot access the second distributed ledger and/or the data tracked by the second distributed ledger because the first client and/or the first set of peers are not authorized to access and/or communicate via the second channel. Similarly, the second client and/or the second set of peers cannot access the first distributed ledger and/or the data tracked by the first distributed ledger because the second client and/or the second set of peers are not authorized to access and/or communicate via the first channel.

Orderer cluster 140 may create a new channel using a suitable command, instruction, or transaction (e.g., the "channel config update" transaction of the Hyperledger Fabric). Configuration and/or other information for the new channel may be stored within a genesis block that is associated with the new channel. The configuration may contain information about orderer cluster 140. For instance, the configuration may specify a channel identifier by which peers and/or client devices 510 can connect to orderer cluster 140. By creating and/or storing the genesis block as well as receiving the endorsed data that is to be committed to the distributed ledger, orderer cluster 140 may provide at least one node and/or point of the multi-node resiliency for a restarted peer.

Orderer cluster 140 may deliver the data from client device 110 to a set of connected peers. In some embodiments, orderer cluster 140 may output the data to all peers of a distributed ledger and/or associated with a given communication channel in the same logical order that the data is received. Orderer cluster 140 may also ensure that data received from client device 110 is distributed to each peer in a corresponding channel even if one or more peers are temporarily unavailable (e.g., experiencing a failure and/or being restarted).

Each node 120 (e.g., nodes 120-1 and 120-2 illustrated in FIG. 5) may include a different, discrete set of resources that can be configured as one or more peers of a peer-to-peer, private, and/or permissioned blockchain network. The resources may include hardware resources such as processors, memory, disk storage, network bandwidth, etc. The resources may also include software that configures nodes 120 for different uses. As noted above, nodes 120 may represent resources of one or more cloud platforms, and may be configured to create the blockchain network with multi-node resiliency of some embodiments.

In FIG. 5, nodes 120-1 and 120-2 may be configured as peers that are connected to at least one communication channel created by orderer cluster 140. Consequently, the peers, executing on nodes 120-1 and 120-2, maintain synchronized ledgers 130-1 and 130-2 that correspond to the distributed ledger for the communication channel.

The peers, configured on nodes 120, may join a communication channel created by orderer cluster 140 in order to provide endorsement of data for a distributed ledger associated with the joined communication channel and/or commit endorsed data in the form of blocks to the distributed ledger. In some embodiments and as was illustrated above with reference to FIG. 3, the peers may be configured to provide at least one node and/or point of the multi-node resiliency for a restarted peer.

A peer may join a channel via a suitable command or instruction (e.g., the "peer channel join" command of the Hyperledger Fabric) to orderer cluster 140. If the peer is authorized to join a particular channel, orderer cluster 140 may provide the peer with the genesis block for the blockchain network associated with the particular channel, the channel configuration, and/or certificates that the peer can use to endorse data.

A connected peer may use the genesis block to start a local copy of the ledger for the particular channel. For instance, a first peer running on node 120-1 may maintain ledger 130-1, and a second peer running on node 120-2 may maintain ledger 130-2. The channel configuration may provide the peer with information for connecting to a particular channel created by orderer cluster 140 (e.g., the channel identifier for connecting to orderer cluster 140), and the peer may connect to orderer cluster 140 via the particular channel in order to receive additional blocks for the distributed ledger maintained by peers participating in the particular channel. The certificates may provide a unique private key to each peer. In some embodiments, the certificates are created using a suitable tool (e.g., cryptogen provided by the Hyperledger Fabric). The peers may use the private keys to validate membership in the blockchain and/or for various actions related to the endorsement and committing of data to the distributed ledger.

Peer endorsement may be controlled by endorsement policies 520-1 and 520-2. Endorsement policies 520-1 and 520-2 may define one or more conditions for valid data endorsement. The one or more conditions may define how a peer endorses data submitted by client device 110. For instance, endorsement policies 520-1 and 520-2 may contain logical expressions that evaluate to true or false based on data provided by client device 110. Endorsement policies 520-1 and 520-2 may also verify that endorsement requests are submitted by an authorized client device 110 (e.g., contain a valid signature that is generated using a private key of an authorized client device 110).

The peers may return their endorsement response to client device 110. Each peer's response may include a read/write set, the endorsing peer's signature (e.g., generated using the peer's private key), and an indication whether the endorsement was successful or unsuccessful. Client device 110 may determine whether a consensus is reached regarding the endorsement of the data based on the returned responses. Once a consensus is reached, client device 110 may provide the data with the signed responses to orderer cluster 140 for distribution to the participating peers and for commitment to ledgers 130-1 and 130-2.

Ledgers 130-1 and 130-2 may collectively form a distributed ledger in response to first and second peers operating on nodes 120-1 and 120-2 synchronizing the endorsed data that is committed to ledgers 130-1 and 130-2. Ledgers 130 may provide a verifiable history of all endorsed data (e.g., state changes, transactions, and/or information) that occurs during the operation of the blockchain network. Ledgers 130 may store some ordered set of data. More specifically, ledgers 130 may store an ordered hashchain of blocks of endorsed data. Orderer cluster 140 may impose the order of blocks in ledgers 130, and each block may contain an array of ordered and endorsed data. Accordingly, ledgers 130 may allow the peers to replay or reconstruct the history of all data and/or state of the blockchain network.

Storage 150-1 and 150-2 may be configured on resources of nodes 120-1 and 120-2 on which the peers execute. Accordingly, each peer may have a storage instance that can be used for synchronization upon restart. For instance, a first peer may use storage 150-1, and a second peer may use storage 150-2 for ledger synchronization during peer restart. Storage 150-1 and storage 150-2 may provide a first point of resiliency for the storage-based resiliency illustrated by FIG. 2 above or the peer-based resiliency illustrated by FIG. 3 above. For instance, before a first peer operating on node 120-1 restarts, the first peer may store a copy of its synchronized local ledger 130-1 to storage 150-1. Upon restarting the first peer on node 120-1, the first peer may retrieve the synchronized local ledger 130-1 from storage 150-1 and resume operation in the blockchain network. Alternatively, the first peer may restart, identify node 120-2 as a second peer operating in the same blockchain network as the first peers, and may synchronize its local ledger with ledger 130-2 of the second peer upon restart by accessing storage 150-2.

Storage 150-3 and 150-4 may provide different points of resiliency for a restarted peer. Storage 150-3 may include a node in the same region as nodes 120-1 and node 120-2 to which the first and second peers may store the genesis block and/or ledgers 130. Since the peers may restart on different nodes, it may be more efficient for each restarted peer to access storage 150-3 for ledger synchronization then identifying nodes 120 on which other peers are currently operating before accessing local storage 150 of a node identified to be running a peer.

Storage 150-4 may include a node that operates from a different region and/or a different cloud platform than nodes 120-1 and node 120-2. Accordingly, there may be greater latency for a restarted node to access storage 150-4 than storage 150-3. Nonetheless, storage 150-4 may provide resiliency and may be used for ledger synchronization when nodes 120-1 and 120-2 and storage 150-1, 150-2, and 150-3 in a given region become unavailable and a peer is restarted on a node in a different region.

Figure 6:
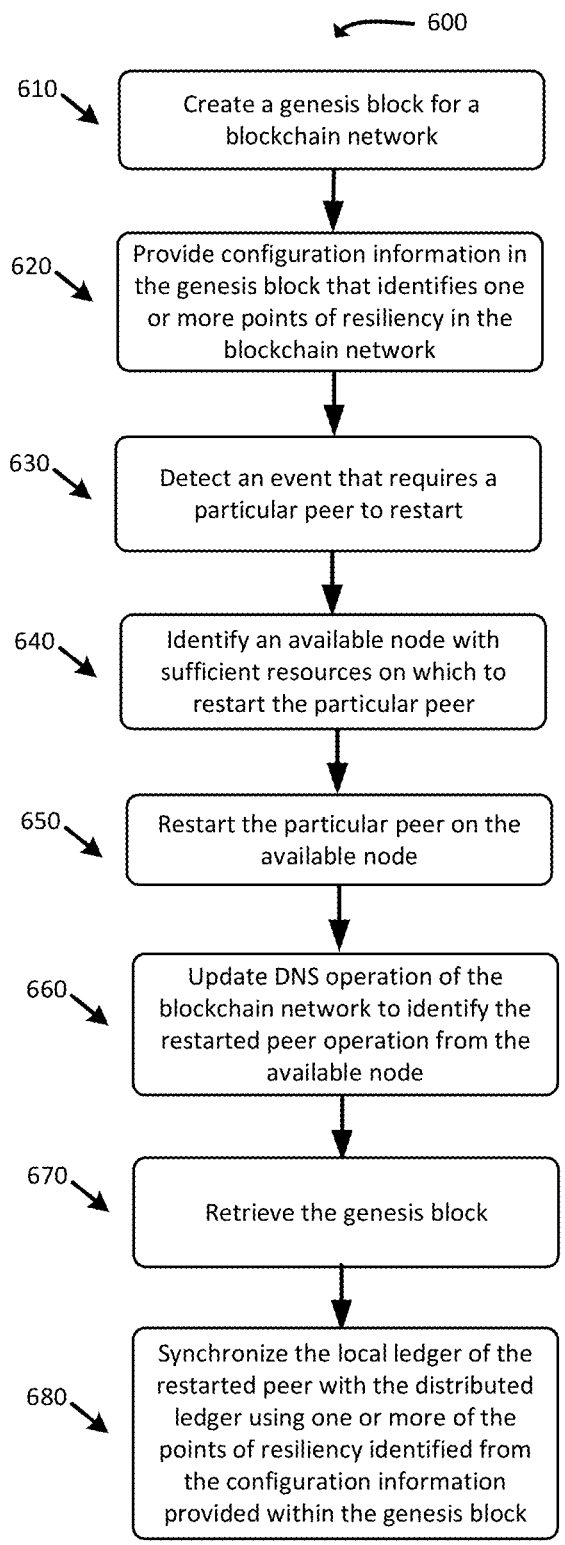
FIG. 6 presents an example process for providing multi-node resiliency in accordance with some embodiments described herein.

FIG. 6 presents example process 600 for providing multi-node resiliency in accordance with some embodiments described herein. Process 600 may include creating (at 610) a genesis block for a blockchain network, and providing (at 620) configuration information in the genesis block that identifies one or more points of resiliency in the blockchain network. In some embodiments, the configuration information identifying the one or more points of resiliency may include addressing and/or other identifiers for accessing one or more of orderer cluster 140, peers participating in the blockchain network (e.g., the first peer operating from node 120-1 and the second peer operating from node 120-2), and/or storage 150 as different points of resiliency.

Process 600 may include detecting (at 630) an event that requires a particular peer to restart. In some embodiments, the particular peer, another peer, and/or orderer cluster 140 may detect the event that requires the particular peer to restart. For instance, the particular peer may enforce a policy to periodically patch and/or update the particular peer software, and to restart in order for the changes to take effect. Orderer cluster 140 may also detect when the particular peer becomes unresponsive as a result of a failure or other event that necessitates restarting the particular peer.

Process 600 may include identifying (at 640) an available node with sufficient resources on which to restart the particular peer. The particular peer may be restarted on the same node on which it currently executes, or may be restarted on a different node depending on whether the current node offers sufficient resources and/or performance, whether one or more failures prevent restarting the particular peer on the current node, whether the particular peer can be restarted on the same node, etc.

Process 600 may include restarting (at 650) the particular peer on the available node. As noted above, restarting the particular node may include installing and/or configuring software for the particular peer on the available node. The particular peer may install and/or configure the software when restarting (at 650) in response to a controlled event as per the procedure described above with reference to FIG. 2. Alternatively, orderer cluster 140 or another peer may detect that the particular peer is unresponsive, and may restart (at 650) the particular peer on the available node.

Process 600 may include updating (at 660) DNS operation of the blockchain network to identify addressing of the node running the restarted peer for requests directed to the restarted peer. Additionally, or alternatively, the restarted peer may advertise addressing of the node to identify the operating location of the restarted peer to other participants in the blockchain network.

Process 600 may also include retrieving (at 670) the genesis block, and synchronizing (at 680) the local ledger of the restarted peer with the distributed ledger using one or more of the points of resiliency identified from the configuration information provided within the genesis block. The particular peer may retrieve the genesis block and synchronize its local ledger upon restarting by connecting to orderer cluster 140 in order to join the blockchain network, receiving the genesis block in response to joining the blockchain network, and obtaining missing blocks and/or other information for synchronizing its local ledger from the one or more points of resiliency identified from the configuration information provided within the genesis block. In some embodiments, the restarted peer may be configured with a domain name, addressing, and/or other identifiers for connecting to orderer cluster 140 and/or obtaining the genesis block from the one or more points of resiliency.

Orderer cluster 140 may be a central point within the blockchain network that brokers the exchange of endorsed data between client device 110 and the peers. If orderer cluster 140 experiences a failure or is otherwise not operational for some period of time, client devices 110 may be unable to submit new data to enter into the distributed ledger, leading to the distributed ledger losing synchronization with client devices 110 and/or the data that should be tracked to the distributed ledger. Accordingly, some embodiments provide resiliency at orderer cluster 140.

Figure 7:
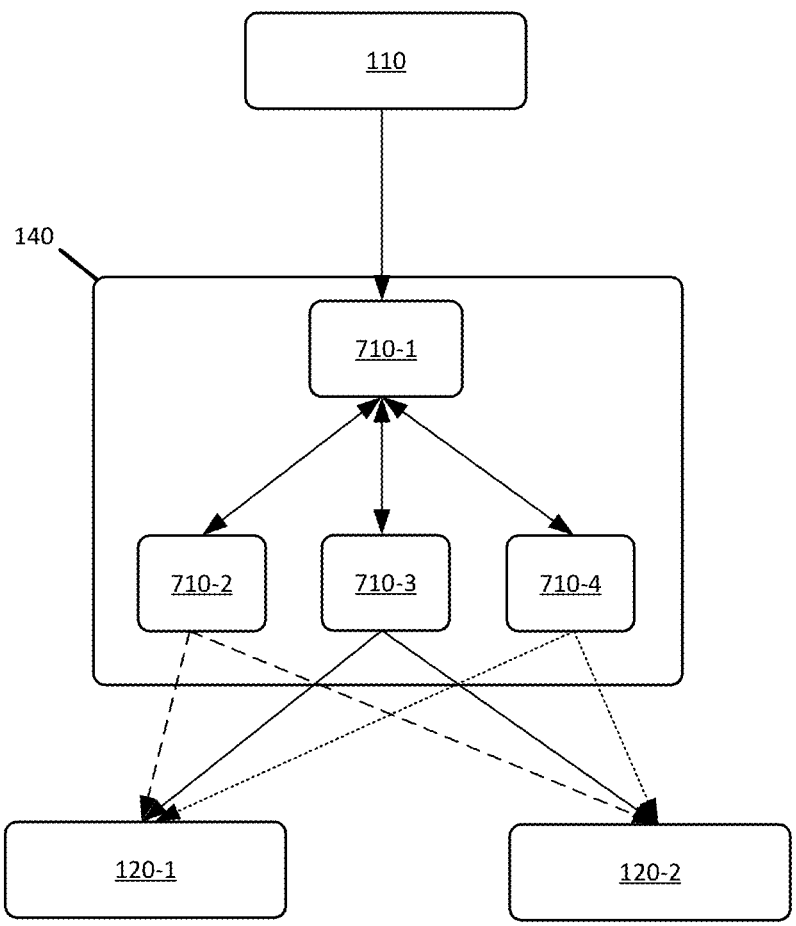
FIG. 7 conceptually illustrates an example of a multi-node resilient orderer cluster in accordance with some embodiments described herein.

FIG. 7 conceptually illustrates an example of multi-node resilient orderer cluster 140 in accordance with some embodiments described herein. As shown in FIG. 7, orderer cluster 140 may include multiple orderer nodes 710-1, 710-2, 710-3, and 710-4 (herein sometimes collectively referred to as "orderer nodes 710" or individually as "orderer node 710").

One or more orderer nodes 710 may be designated as a data publisher that receives data pending ledger commitment from one or more client devices 110. In FIG. 7, orderer node 710-1 is designated as the data publisher.

Other orderer nodes 710 (e.g., 710-2, 710-3, and 710-4) may operate as data distributors. Each data distributor orderer node may be associated with one or more communication channels, may obtain data for an associated communication channel from data publisher orderer node 710-1, and may distribute the obtained data to the peers that are connected to that communication channel.

Resiliency is provided as orderer nodes 710 can be reassigned as needed if one or more other orderer nodes 710 fail and/or require additional resources. For instance, orderer node 710-1 may experience a failure that prevents orderer node 710-1 from receiving data from one or more client devices 110. In this instance, any one or more of orderer nodes 710-2, 710-3, and 710-4 can be reassigned as the data publisher orderer node to receive data from client devices 510. Other orderer nodes 710 may then obtain data to distribute to peers that are connected to different channels from the newly assigned data publisher orderer node.

As another example, orderer node 710-2 may be a data distributor for a first communication channel. Orderer node 710-2 may experience a failure that is detected by data publisher orderer node 710-1 and/or other data distributor orderer nodes 710-3 and 710-4. Upon detecting the failure, any one or more of orderer nodes 710-1, 710-3, and 710-4 may be reassigned to distribute data to the connected peers of the first communication channel.

Resiliency at orderer cluster 140 may also be provided based on a different implementation of data distributor orderer nodes 710. In some embodiments, data distributor orderer nodes 710-2, 710-3, and 710-4 are not assigned to any specific channels. Instead, data distributor orderer nodes 710-2, 710-3, and 710-4 use a best effort approach to distribute the data that is received by data publisher node 710-1. For instance, data publisher node 710-1 may queue data that it receives from various client devices 110. Whenever a data distributor orderer nodes 710-2, 710-3, or 710-4 becomes available, it may request data from data publisher orderer node 710-1, may identify the peers connected to the channel to which the data pertains based on a channel identifier associated with the data, and may distribute the data to the identified peers. If a data distributor orderer node 710 fails, it will simply stop requesting data to distribute from data publisher node 710-1, and other data distributor orderer nodes 710 will assume the load.

The multi-node resilient orderer cluster 140 may also provide different nodes or points of resiliency for a restarted peer. For instance, orderer cluster 140 may store the genesis block, and a restarted peer may be configured to connect with orderer cluster 140 and/or request the genesis block from orderer cluster 140 upon restart. Any of orderer nodes 710 may receive and/or respond to the request from the restarted peer, thereby providing resiliency in the event one or more of the orderer nodes 710 are inaccessible or unresponsive to the request from the restarted peer.

Figure 8:
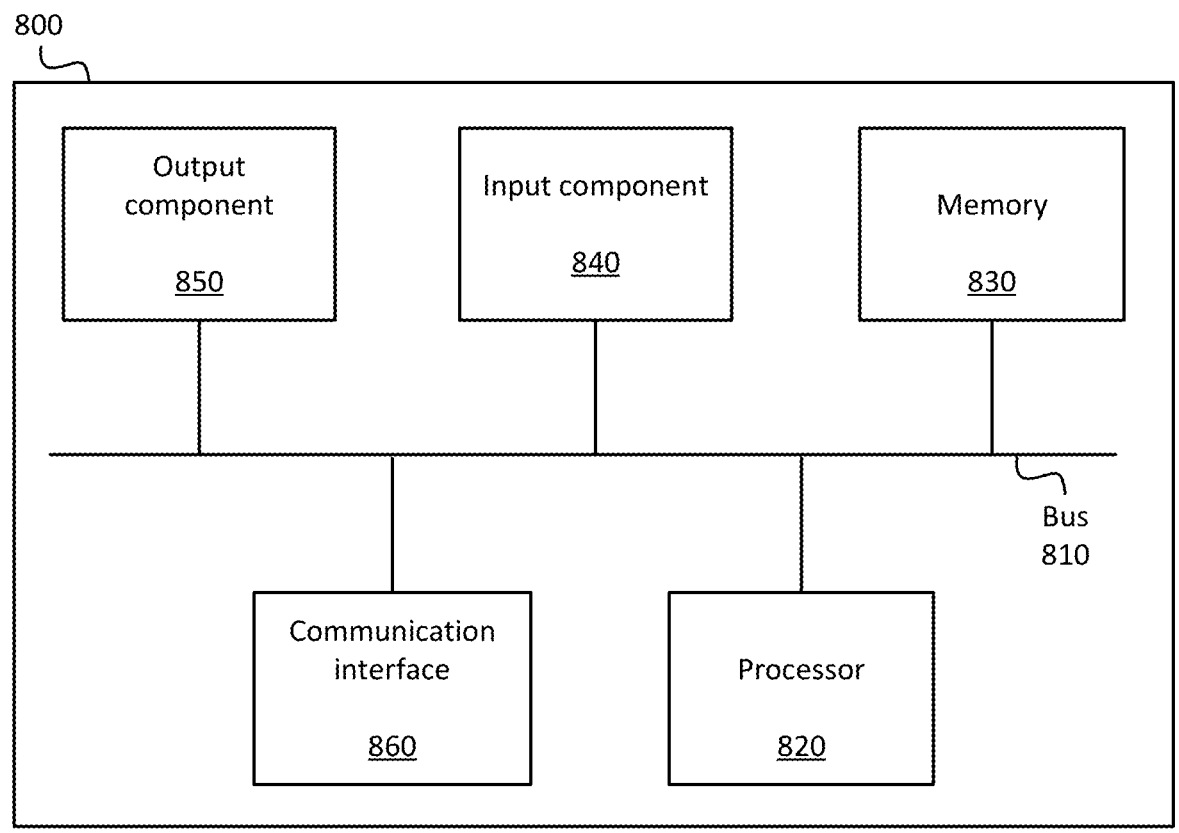
FIG. 8 illustrates example components of one or more devices, according to one or more embodiments described herein.

FIG. 8 is a diagram of example components of device 800. Device 800 may be used to implement one or more of the devices or systems described above (e.g., client device 110, nodes 120, orderer cluster 140, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For instance, the devices may be arranged according to different peer-to-peer, private, permissioned, and/or other blockchain networks.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of blocks and/or signals have been described with regard to FIGS. 1-6, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described m conjunction with thresholds. The term "greater than" (or similar terms), as used herein to describe a relationship of a value to a threshold, may be used interchangeably with the term "greater than or equal to" (or similar terms) Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device comprising:
   one or more processors configured to:
      identify a genesis block of a distributed ledger that is associated with a blockchain network, wherein the genesis block is a first block of the distributed ledger, wherein the genesis block includes information specifying a point of resiliency associated with the blockchain network;
      retrieve, from the point of resiliency associated with the blockchain network and based on the information specifying the point of resiliency, a first set of endorsed data associated with the blockchain network;
      compare the first set of endorsed data to a second set of endorsed data maintained by a particular peer associated with the blockchain network;
      determine, based on the comparing, that the first set of endorsed data differs from the second set of endorsed data; and
      modify the second set of endorsed data, maintained by the particular peer, based on the first set of endorsed data received from point of resiliency associated with the blockchain network.

2. The device of claim 1, wherein the particular peer associated with the blockchain network is a first peer, wherein the point of resiliency includes a second peer associated with the blockchain network.

3. The device of claim 1, wherein the one or more processors are further configured to:
identify an interruption in operation of the particular peer; and
identify a resumption of operation of the particular peer after the interruption in operation of the first peer,
wherein comparing the first set of endorsed data to the second set of endorsed data is performed based on identifying the resumption of operation of the particular peer after the interruption in operation of the first peer.

4. The device of claim 1,
wherein determining that the first set of endorsed data differs from the second set of endorsed data includes determining that the first set of endorsed data includes particular endorsed data not included in the second set of endorsed data, and
wherein modifying the second set of endorsed data includes adding at least the particular endorsed data to the second set of endorsed data.

5. The device of claim 1, wherein the one or more processors are further configured to identify a third set of endorsed data that corresponds to a previous version of the first set of endorsed data,
wherein modifying the second set of endorsed data is further based on the identified third set of endorsed data.

6. The device of claim 1, wherein modifying the second set of endorsed data includes modifying an order of the second set of endorsed data.

7. The device of claim 1, wherein the point of resiliency includes a cloud-based storage system.

8. A non-transitory computer-readable medium, storing a plurality of processor-executable instructions to:
identify a genesis block of a distributed ledger that is associated with a blockchain network, wherein the genesis block is a first block of the distributed ledger, wherein the genesis block includes information specifying a point of resiliency associated with the blockchain network;
retrieve, from the point of resiliency associated with the blockchain network and based on the information specifying the point of resiliency, a first set of endorsed data associated with the blockchain network;
compare the first set of endorsed data to a second set of endorsed data maintained by a particular peer associated with the blockchain network;
determine, based on the comparing, that the first set of endorsed data differs from the second set of endorsed data; and
modify the second set of endorsed data, maintained by the particular peer, based on the first set of endorsed data received from point of resiliency associated with the blockchain network.

9. The non-transitory computer-readable medium of claim 8, wherein the particular peer associated with the blockchain network is a first peer, wherein the point of resiliency includes a second peer associated with the blockchain network.

10. The non-transitory computer-readable medium of claim 8, wherein the plurality of processor-executable instructions further include processor-executable instructions to:
identify an interruption in operation of the particular peer; and
identify a resumption of operation of the particular peer after the interruption in operation of the first peer,
wherein comparing the first set of endorsed data to the second set of endorsed data is performed based on identifying the resumption of operation of the particular peer after the interruption in operation of the first peer.

11. The non-transitory computer-readable medium of claim 8,
wherein determining that the first set of endorsed data differs from the second set of endorsed data includes determining that the first set of endorsed data includes particular endorsed data not included in the second set of endorsed data, and
wherein modifying the second set of endorsed data includes adding at least the particular endorsed data to the second set of endorsed data.

12. The non-transitory computer-readable medium of claim 8, wherein the plurality of processor-executable instructions further include processor-executable instructions to identify a third set of endorsed data that corresponds to a previous version of the first set of endorsed data,
wherein modifying the second set of endorsed data is further based on the identified third set of endorsed data.

13. The non-transitory computer-readable medium of claim 8, wherein modifying the second set of endorsed data includes modifying an order of the second set of endorsed data.

14. The non-transitory computer-readable medium of claim 8, wherein the point of resiliency includes a cloud-based storage system.

15. A method, comprising:
identifying a genesis block of a distributed ledger that is associated with a blockchain network, wherein the genesis block is a first block of the distributed ledger, wherein the genesis block includes information specifying a point of resiliency associated with the blockchain network;
retrieving, from the point of resiliency associated with the blockchain network and based on the information specifying the point of resiliency, a first set of endorsed data associated with the blockchain network;
comparing the first set of endorsed data to a second set of endorsed data maintained by a particular peer associated with the blockchain network;
determining, based on the comparing, that the first set of endorsed data differs from the second set of endorsed data; and
modifying the second set of endorsed data, maintained by the particular peer, based on the first set of endorsed data received from point of resiliency associated with the blockchain network.

16. The method of claim 15, further comprising:
identifying an interruption in operation of the particular peer; and
identifying a resumption of operation of the particular peer after the interruption in operation of the first peer,
wherein comparing the first set of endorsed data to the second set of endorsed data is performed based on identifying the resumption of operation of the particular peer after the interruption in operation of the first peer.

17. The method of claim 15,
wherein determining that the first set of endorsed data differs from the second set of endorsed data includes determining that the first set of endorsed data includes particular endorsed data not included in the second set of endorsed data, and wherein modifying the second set of endorsed data includes adding at least the particular endorsed data to the second set of endorsed data.

18. The method of claim 15, further comprising identify a third set of endorsed data that corresponds to a previous version of the first set of endorsed data, wherein modifying the second set of endorsed data is further based on the identified third set of endorsed data.

19. The method of claim 15, wherein modifying the second set of endorsed data includes modifying an order of the second set of endorsed data.

20. The method of claim 15, wherein the point of resiliency includes a cloud-based storage system.

* * * * *